May 21, 1946.  L. A. MARIHART  2,400,562
AGRICULTURAL MACHINE
Filed April 12, 1943  11 Sheets-Sheet 1

INVENTOR
LEO A. MARIHART.
BY Paul D. Flehr
ATTORNEY.

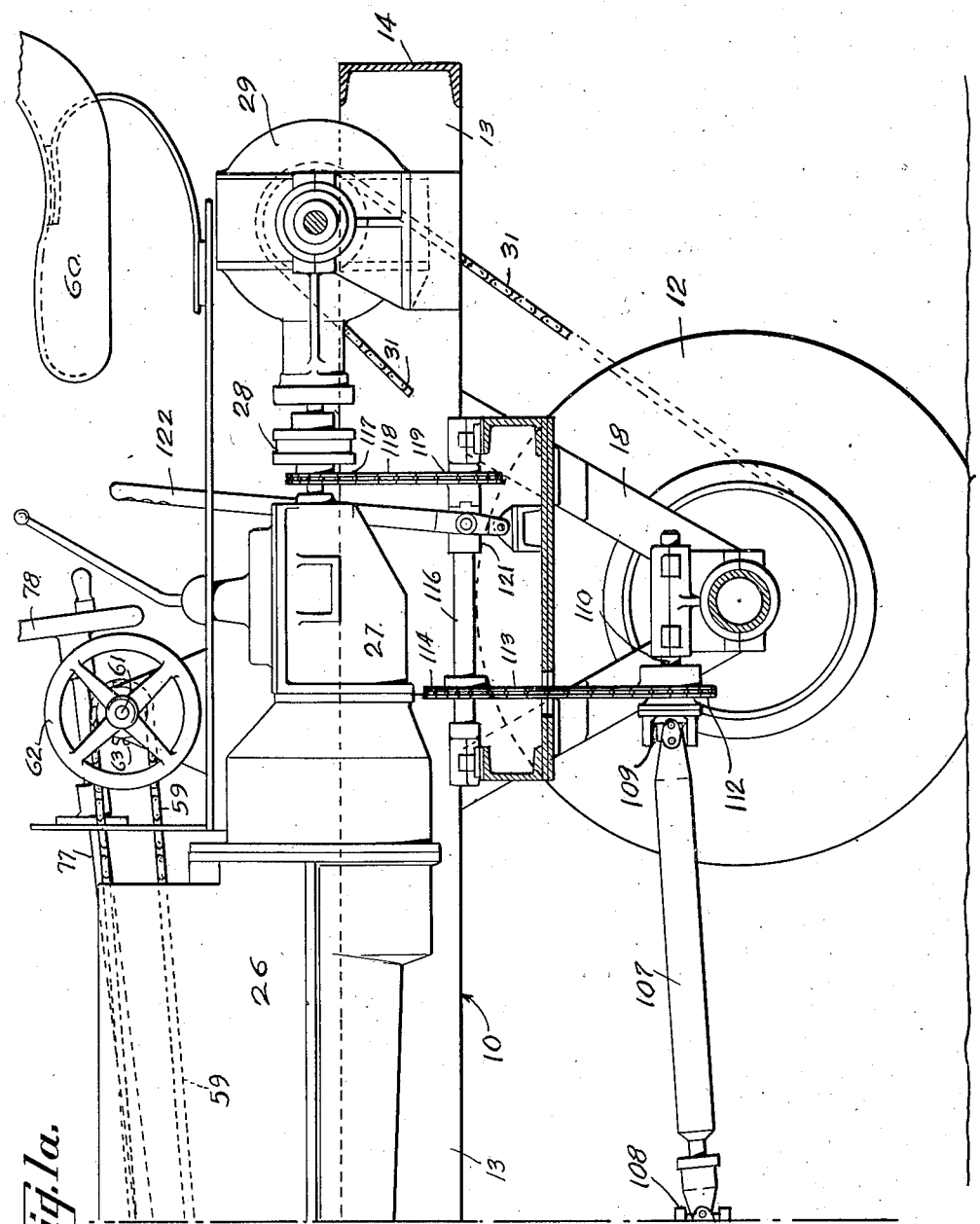

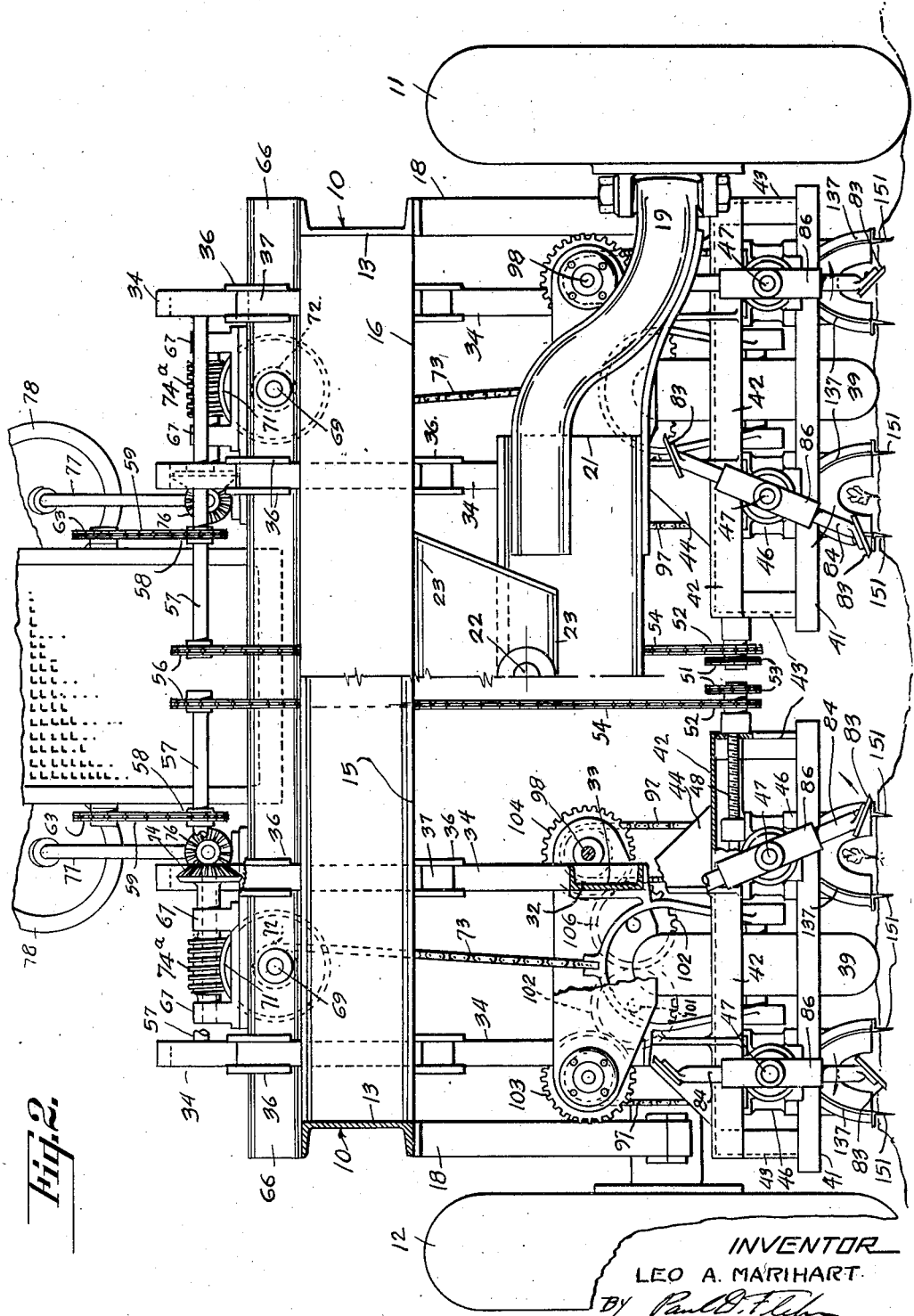

May 21, 1946.　　　L. A. MARIHART　　　2,400,562
AGRICULTURAL MACHINE
Filed April 12, 1943　　　11 Sheets-Sheet 4

INVENTOR
LEO A. MARIHART
BY
ATTORNEY.

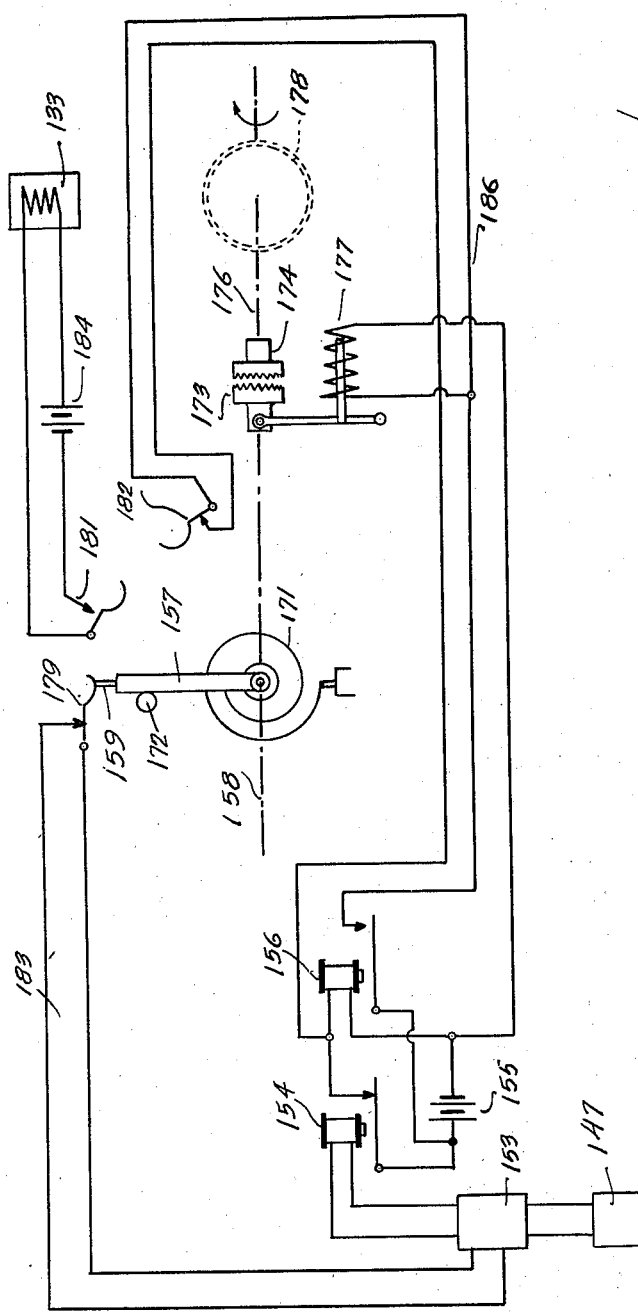
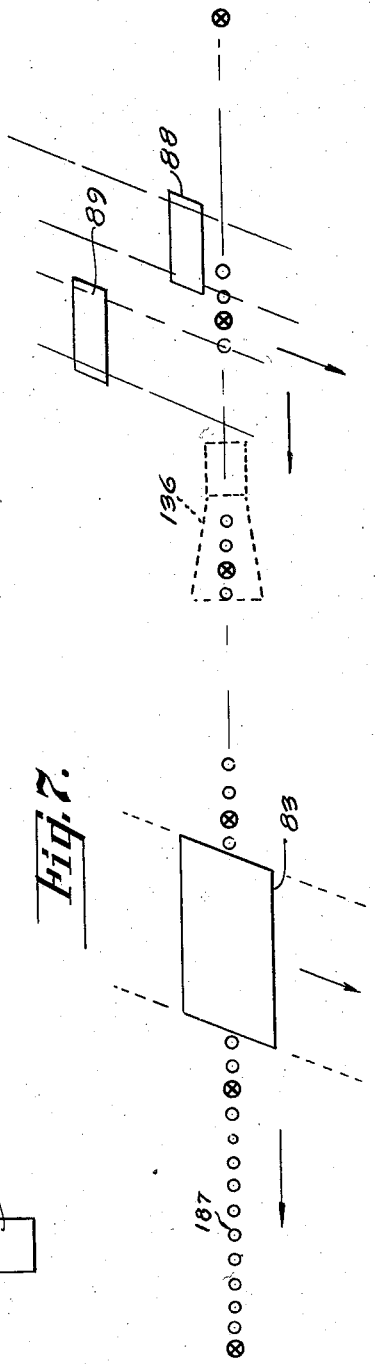

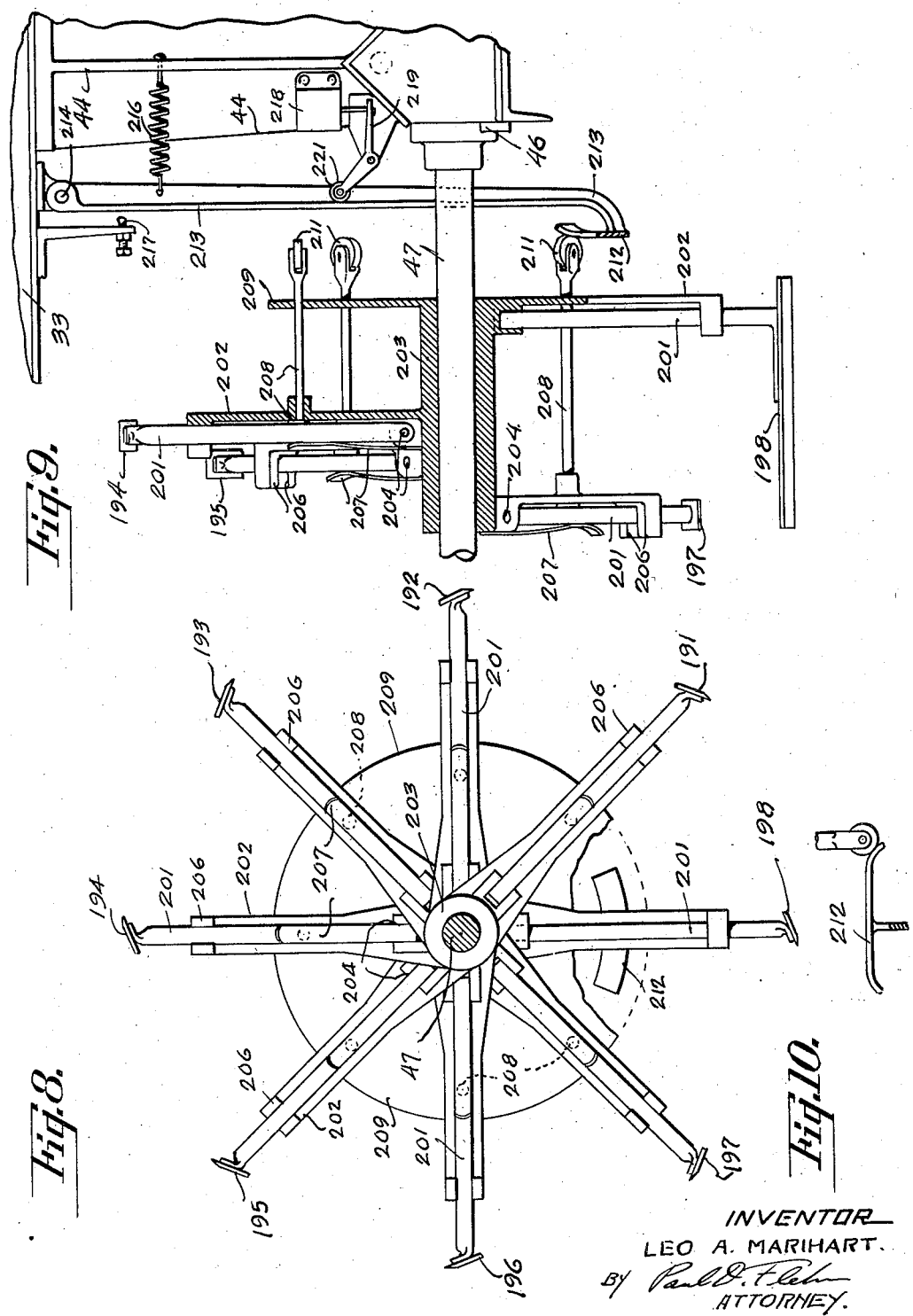

May 21, 1946.  L. A. MARIHART  2,400,562
AGRICULTURAL MACHINE
Filed April 12, 1943  11 Sheets-Sheet 7
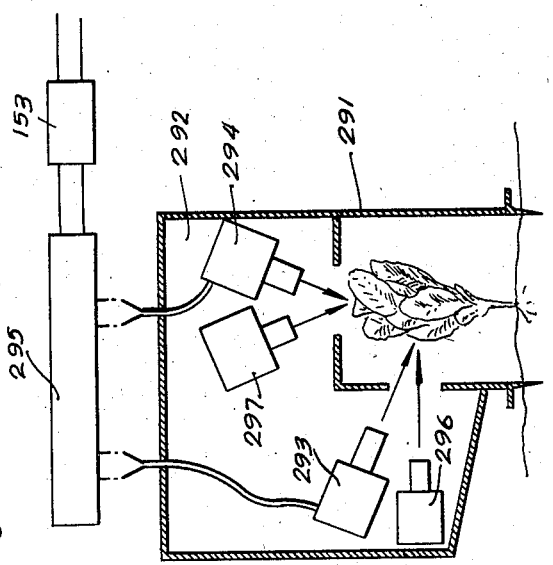
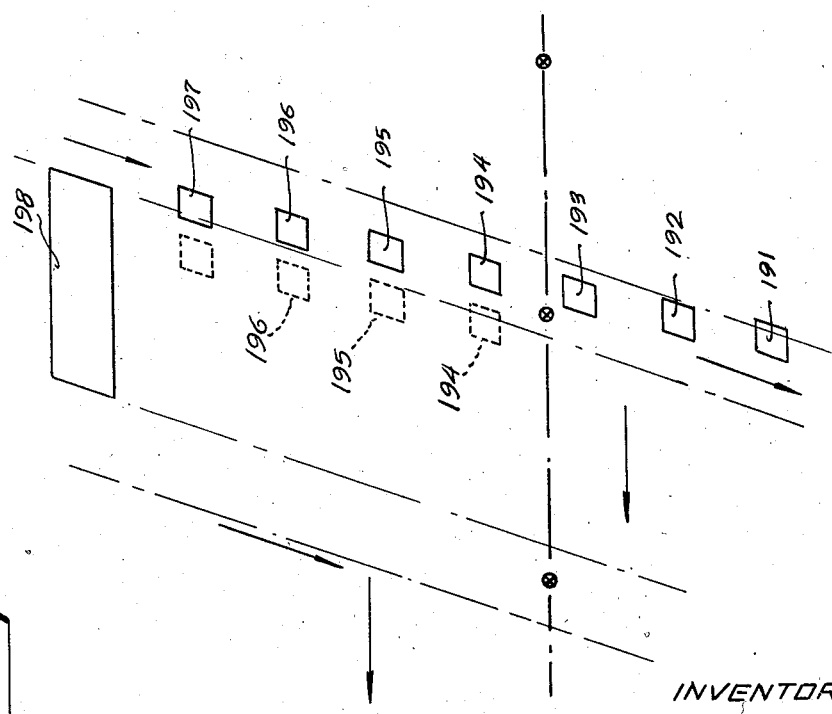
INVENTOR
LEO A. MARIHART
BY
ATTORNEY.

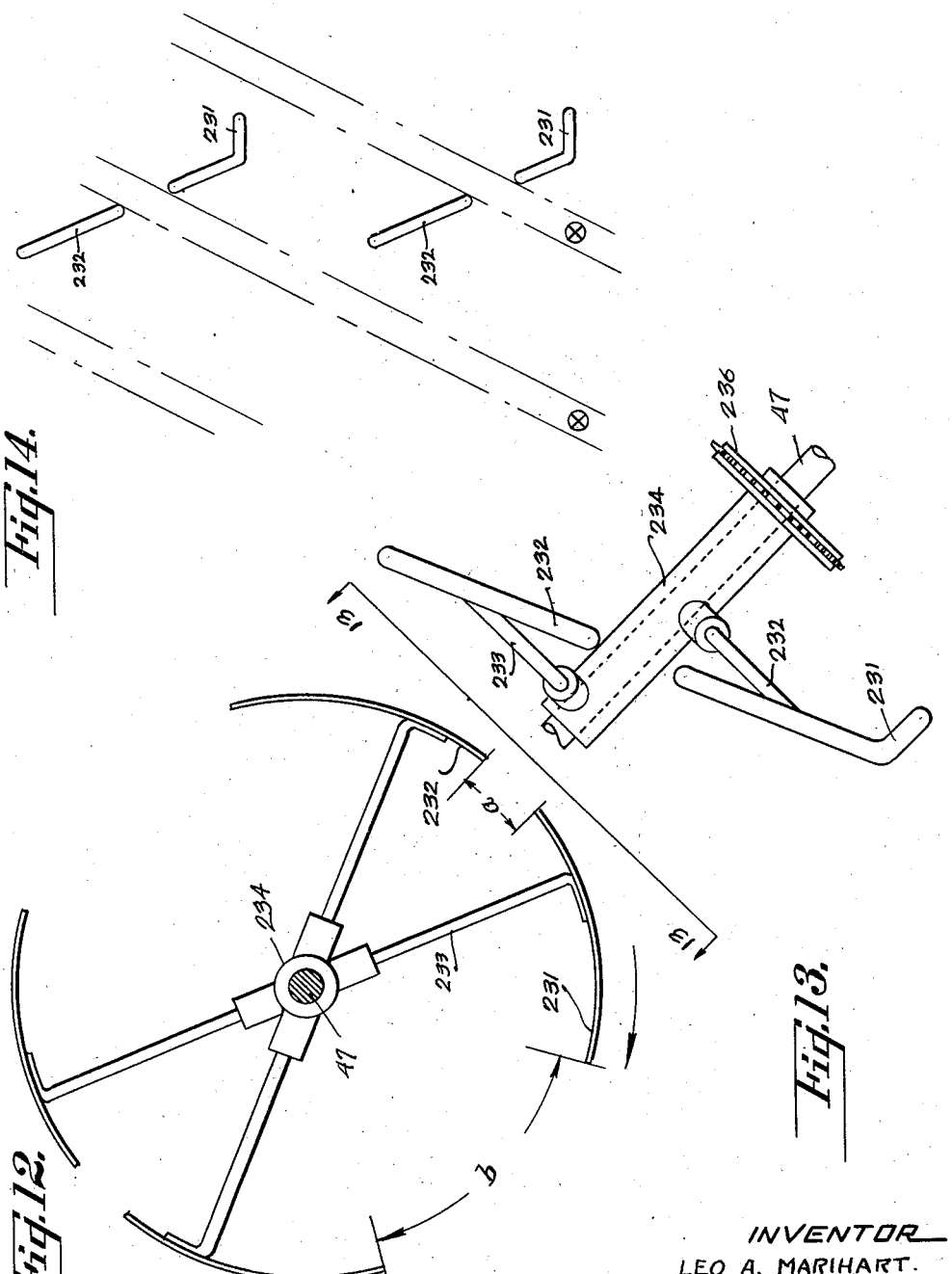

May 21, 1946.  L. A. MARIHART  2,400,562
AGRICULTURAL MACHINE
Filed April 12, 1943  11 Sheets-Sheet 9

INVENTOR
LEO A. MARIHART
BY
ATTORNEY.

May 21, 1946. L. A. MARIHART 2,400,562
AGRICULTURAL MACHINE
Filed April 12, 1943 11 Sheets-Sheet 10
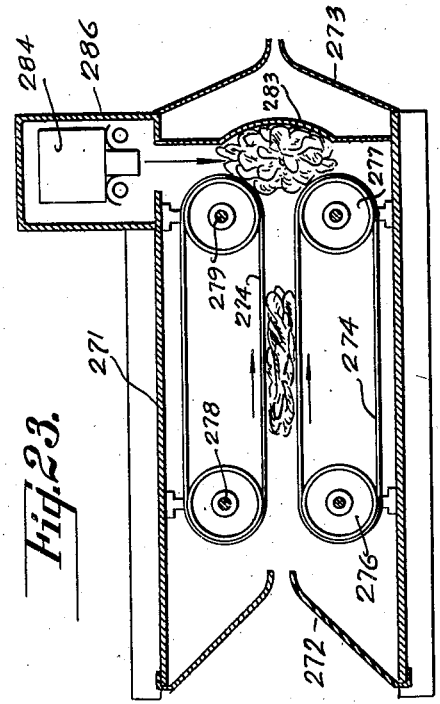
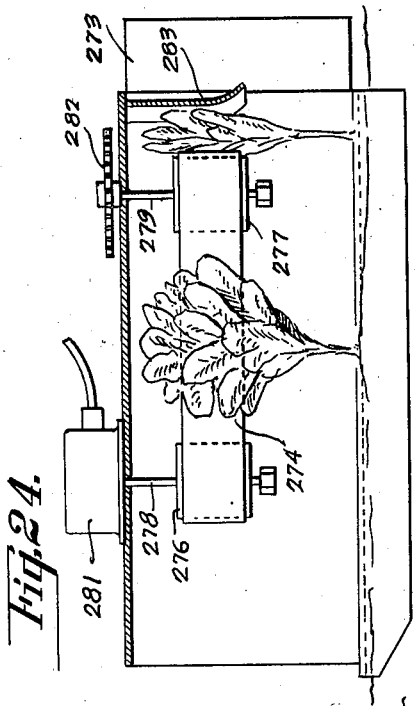
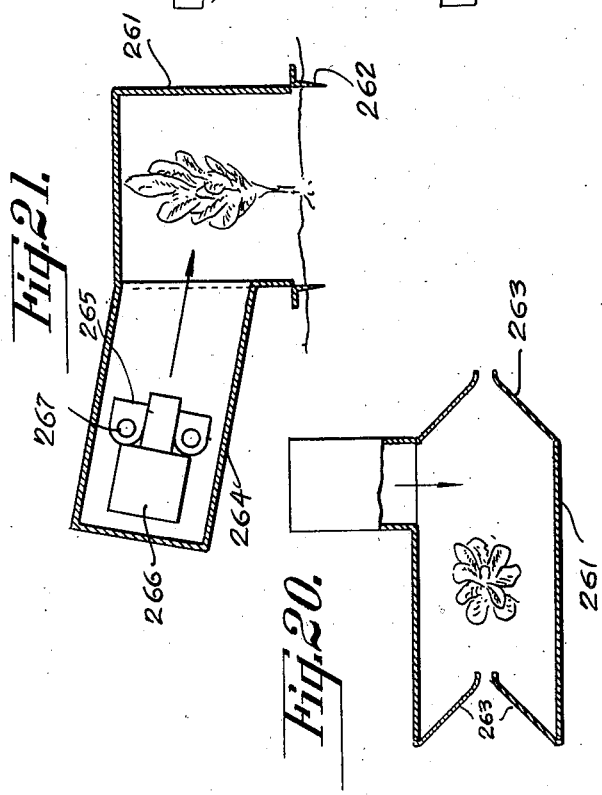
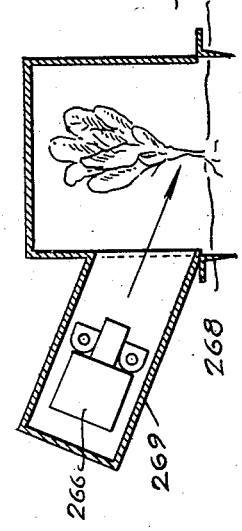
INVENTOR
LEO A MARIHART.
BY
ATTORNEY.

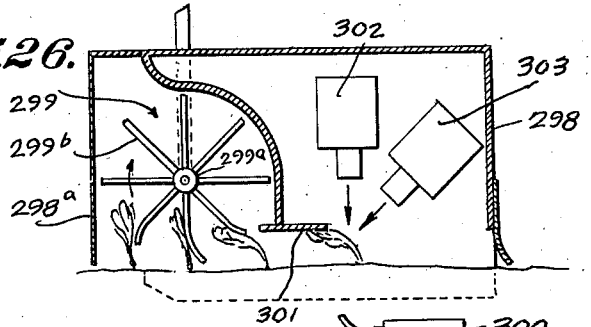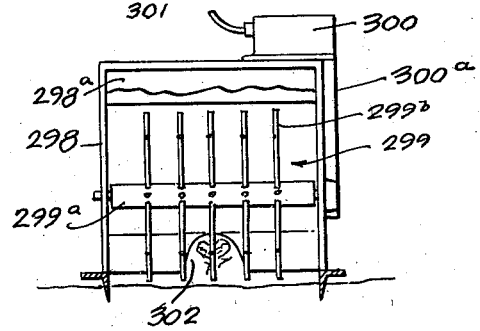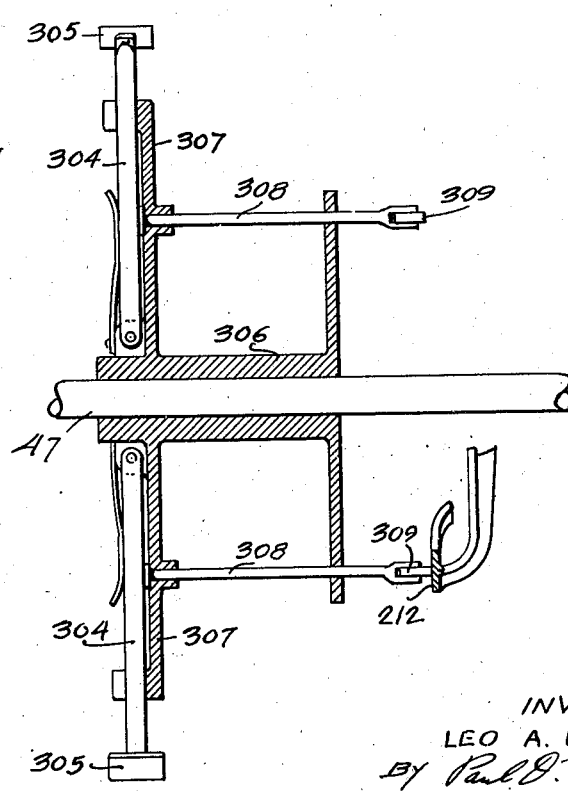

Patented May 21, 1946

2,400,562

UNITED STATES PATENT OFFICE 2,400,562

AGRICULTURAL MACHINE

Leo A. Marihart, Monterey County, Calif.

Application April 12, 1943, Serial No. 482,679

14 Claims. (Cl. 97—15)

This invention relates generally to agricultural machines of the type used in the raising of plants.

As is understood by those familiar with agricultural methods, various procedures are involved in the raising of different crops, such as for example lettuce, sugar beets, cotton, and the like. Where plants are started from seed it is customary to plant in regularly spaced rows, and then to thin out the young plants, leaving single sturdy plants at regular intervals. Where transplanting is employed the young plants from seedlings are set in rows at regular intervals, and thus the thinning out process is eliminated. During the development of the plants and before they reach maturity, considerable cultivating and weeding is required.

Insofar as I am aware, at the present time no satisfactory machine has been developed for carrying out such thinning, weeding or hoeing operations automatically by machine, as distinguished from hand labor. Practically all thinning is carried out by hand, except that machines have been used for cutting out plants at regular intervals, leaving clumps of plants to be subsequently thinned out by hand. Weeding operations between plants have also required a large amount of hand labor after use of ordinary cultivator tools.

In the past it has been proposed to control agricultural machines automatically by use of a photoelectric or light sensitive cell. However such proposals have not been practical for commercial operations, which attribute to inaccurate and improper control of the ground engaging tools, and to the inaccurate and unreliable way in which the photoelectric cell is actuated.

It is an object of the present invention to provide an automatically operated agricultural machine capable of relatively accurate and reliable control, and which can be used in the culture of a wide variety of plants.

Another object of the invention is to provide a more accurate and reliable control of an agricultural machine by use of a photoelectric cell. In this connection the invention is characterized by exclusion of daylight in obtaining an indication from a plant, and by utilization of a portion of the plant for an indication which is capable of securing the degree of accuracy required.

Another object of the invention is to provide an agricultural machine controlled automatically by photoelectric cell, which is capable of carrying out desired hoeing or weeding operations with a fair rate of forward movement of the machine.

Another object of the invention is to provide a practical machine for carrying out plant thinning operations automatically. In this connection the machine when adapted for thinning operations is characterized by the use of one means for coarse hoeing at regular intervals, and a second means for fine hoeing upon both sides of a plant located within the spaces lying between the intervals of coarse hoeing.

Further objects of the invention will appear from the following description in which the preferred embodiments have been set forth in detail in conjunction with the accompanying drawings.

Referring to the drawings—

Figures 1 and 1a taken together, constitute a side elevational view of the machine incorporating the present invention.

Figure 2 is a front view of the machine, with the left hand half of the figure being in cross section.

Figure 6 is a circuit diagram showing the connection for electrical parts of the machine described with reference to Figures 1 to 5 inclusive.

Figure 7 is a diagrammatic view serving to illustrate the manner in which the hoeing device is operated upon a row of plants.

Figure 8 is an end view of another type of hoeing device which can be used with the machine, and involving use of both fine and coarse hoeing elements upon the same structure.

Figure 9 is a side elevational view in cross section of the hoeing device shown in Figure 8, and showing the means for advancing a selected number of fine hoeing elements for skipping a plant.

Figure 10 is a detail illustrating the cam element for controlling advancing of the hoe elements of the device shown in Figures 8 and 9.

Figure 11 is a diagrammatic view illustrating the manner in which the hoeing device of Figures 8 and 9 operates upon a row of plants.

Figure 12 is an end view of a hoeing device suitable for weeding operations.

Figure 13 is a side view of the hoeing device shown in Figure 12, projected to the plane indicated by line 13—13.

Figure 14 is a diagrammatic view illustrating the manner in which the hoeing wheel of Figures 12 and 13 operates upon a row of plants.

Figure 20 is a plan view showing another form of huddler intended particularly for larger sized plants.

Figure 21 is an end view, in cross section of the huddler shown in Figure 20, and showing the manner in which the photoelectric cell is sighted toward the leaf portions of the plant.

Figure 22 shows a variation of the huddler shown in Figures 20 and 21, particularly in that the photoelectric cell in this instance is sighted toward the stalks of the plants.

Figure 23 is a plan sectional view, showing another form of huddler involving use of mechanical means for squeezing the foliage portions of the plant.

Figure 24 is a side elevational view in cross section, illustrating the same device as in Figure 23.

Figure 25 is a side elevational view in cross section showing a huddler having two photoelectric units.

Figure 26 is a side elevational view in cross section showing another form of huddler.

Figure 27 is an end view of the huddler shown in Figure 26.

Figure 28 is a side elevational view, in cross section, showing a hoeing wheel having hoeing blades all of the movable type such as incorporated in Figure 8.

Figure 1:
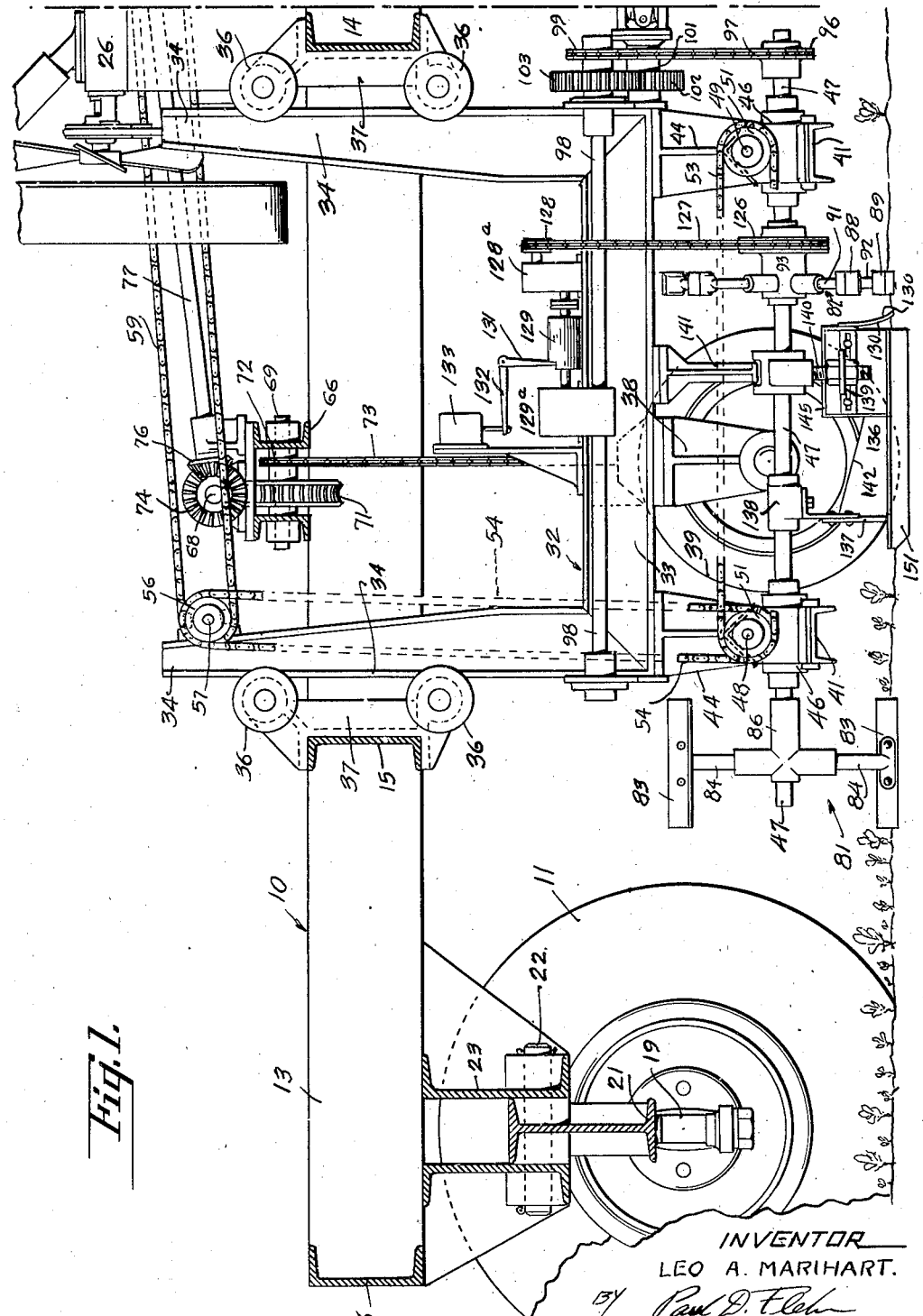

Referring first to Figures 1 and 1a, the machine illustrated consists generally of a frame 10, provided with the front and rear supporting wheels 11 and 12. The particular frame illustrated consists of side structural steel members 13, connected by the rear transverse member 14, intermediate cross members 14 and 15, and forward cross member 16. The dimension of the machine in this instance is such that it may operate simultaneously on four rows of plants.

The rear end of the frame is shown attached to the rear wheels 12 by the brackets 18. The front wheels are shown attached to a cross shaft 21 by the steering knuckles 19. The shaft 21 can be in the form of a structural steel I beam having a central portion fulcrummed by pivot pin 22 to the spaced channels 23. These channels are fixed to the main frame. Suitable steering gear is connected to the steering knuckles 19 for turning the front wheels, according to conventional practice.

The machine may be pulled by a tractor or may be made as a tractor attachment, and in either event the motor of the tractor can supply power to drive the operating parts. However in the embodiment illustrated a motor is provided for driving the machine forwardly, and for applying power to certain tools. Thus I have indicated an internal combustion engine 26 mounted upon the frame, and having its shaft driving through the gear transmission box 27, flexible coupling 28, to the differential gearing 29. From the differential gearing 29 chains 31 serve to directly drive the wheels 12. Suitable braking means (not shown) is provided for the front or back wheels, or both, to facilitate moving from one field to another.

The ground engaging tools for the machine, which will be presently described in detail, are carried by secondary or subframes 32, which are preferably mounted for floating action with respect to the main frame. As shown more clearly in Figure 2 it is desirable to provide two such sub-frames, and to provide each sub-frame with tools for operating upon two parallel rows of plants. Each sub-frame consists of parallel longitudinal structural members 33, such as channels which are connected together by cross extending members as will be presently described. Four parallel posts 34 extend vertically from the frame 32, and engage flanged guide rollers 36, which in turn are carried on the cross members 14 and 15, by the mounting brackets 37. It will be evident that with this arrangement the sub-frame 32 is free to move in a vertical direction with respect to the main frame, but is restrained with respect to lateral movement. Intermediate portions of the channels 33 are connected to a yoke 38, and this yoke forms a mounting for the rubber tired wheel 39. As the machine moves along with wheel 39 contacting the ground, this wheel carries the weight of the secondary fram: 32 and associated parts, whereby the secondary frame assumes a position dependent upon the ground contour contacted by the wheel 39, and independently of vertical movements of the main frame. Near the forward and rear ends of each sub-frame, and below the channels 33, are the cross extending structural members 41 and 42, which may be in the form of an angle and channel respectively. Members 41 and 42 are connected together at their ends by vertical members 43. Each angle 41 is also connected with the channels 33 by connecting brackets 44. Members 41 and 42 form laterally extending guide tracks for the bearing blocks 46. Each pair of blocks serves to journal a shaft 47 which in turn carries certain ground engaging tools as will be presently explained. As is evident from an inspection of Figures 1, 1a and 2, the two shafts 47 for each sub-frame 32 extend in space parallel relationship longitudinally of the direction of travel of the machine, and in practice generally overlie the rows of plants being operated upon.

The purpose of slidably mounting the blocks 46 is to permit lateral adjustment of the two shafts 47 with respect to each other, and with respect to the main frame. Thus forward and rear laterally extending feed screws 48 and 49 are shown, with the ends of these screws being provided with sprockets 51. Each of these screws are provided with right and left hand threads engaged by nuts (not shown) which in turn are carried by the slidable blocks 46. To facilitate operation of the feed screws, the sprockets 51 are connected together by chain 53, while the sprocket 52 in the forward feed screw is shown connected by chain 54 to a sprocket 56 on shaft 57. Shaft 57 is journaled to the upper ends of the vertically extending posts 34, and carries a sprocket 58, which in turn connects with a rearwardly extending chain 59. In front of the driver's seat 60 there is a laterally extending rotatable shaft 61, turned by the hand wheel 62.

Sprocket 63 carried by shaft 61 engages the chain 59, so that upon turning the hand wheel 62 all of the various feed screws of the machine can be rotated in one direction or the other to simultaneously adjust the positioning of the journal blocks 46 while shaft 47 remains parallel.

Occasionally it is desirable to elevate a sub-frame until the wheel 39 and the associated tools are clear of the ground surface. For this purpose I have shown a cross channel 66 carried by the main frame, and carrying journal brackets 67 for the laterally extending shaft 68. For each separate frame there is a counter shaft 69, journaled within the channel 66, and carrying a worm gear 71 and a sprocket 72. A chain 73 engages each sprocket 72, and extends downwardly for connection with the associated sub-frame. The other end of the chain is attached to a suitable spring (not shown). Gear 74 engages a worm 74a mounted upon the shaft 68. Suitable manual means for rotating shaft 68 can consist of the gears 74 and 76, which intermesh, and which are mounted respectively upon shaft 68 and a rearwardly extending shaft 77. Hand wheel 78 is attached to the rear end of shaft 77 and is disposed for convenient turning by the operator of the machine. Normally chains 73 can be slack so as to permit each of the sub-frames to float freely with respect to the main frame. However when the machine is being moved from one operating position to another, both of the sub-frames can be lifted clear of the ground.

Each of the shafts 47 carries ground engaging tools which in this instance constitute a coarse hoeing device 81, and a fine hoeing device 82. As will be presently explained device 81 operates according to a predetermined cycle to hoe along regularly spaced intervals. Device 82 performs carefully controlled fine hoeing operations so that within the clump of plants between the intervals hoed by device 81, device 82 eradicates plants upon both sides of a selected sturdy plant. Device 81 consists of the hoeing blades or like elements 83 which are carried at the outer ends of radially extending arms 84, with these arms in turn being attached to the hub 86. It will be noted that this device is located a considerable distance ahead of the device 82, and as will be presently explained this makes it possible to secure an indication for operation of the photoelectric cell from spaced intervals rather than from a complete and substantially continuous row of plants. Device 82 in this instance consists of three pairs of hoeing elements, the elements of each pair being designated by numbers 88 and 89. These hoeing elements are likewise carried at the outer ends of arms 91 and 92, which in turn are attached to the hub 93. Hub 93 is loose upon the shaft 47, while hub 86 for the forward hoeing device 81 is fixed to the shaft.

Shaft 47 can be driven from any suitable source of power, such as the ground engaging wheels for supporting the main frame or from the motor. Thus in this instance the rear end of each shaft 47 carries a sprocket 96 engaged by the drive chain 97. Each sub-frame 32 carries a pair of spaced parallel counter shafts 98, the rear ends of which carry sprockets 99 for engaging chains 97. Both of the counter shafts 98 are driven from a drive shaft 101, which is suitably journaled to the sub-frame, and which carries a gear 102 which directly meshes with the gear 103 on one of the counter shafts, and which drives gear 104 on the other countershaft (Figs. 2 and 3) through the idler gear 106. Thus the two shafts 47 carried by a particular sub-frame are driven in opposite directions, and at the same speed. Shaft 101 connects to the torque rod 107 through the universal coupling 108, and the rear end of torque rod 107 is connected by universal coupling 109, to the sprocket shaft 110.

In order to drive the shaft 110 it is provided with a sprocket 112 engaging the chain 113. The upper portion of this chain engages a sprocket 114 mounted upon shaft 116. On the shaft extending from the gear transmission 27 there is a sprocket 117 which engages the chain 118. Shaft 116 carries a loose sprocket 119 engaged by chain 118, and this sprocket is adapted to be engaged by shiftable clutch element 121, splined to shaft 116, and shifted by the hand lever 122. Thus the drive to the shafts 47 is positively established from the motor 26, so that these shafts are driven in unison at a speed in synchronism with the speed of forward movement of the machine. While it will be appreciated that the driving speeds may vary in different instances, according to the plants being operated upon and the desired character of thinning operation, in a typical instance the shafts 47 can be driven at a speed of say 4.7 revolutions for one revolution of the ground engaging wheels 11 and 12, where these wheels have an effective diameter of about 36½ inches.

As previously pointed out the hub 93 of the hoeing device 82 is loose upon its associated shaft 47. To form driving means for device 82, hub 93 is shown provided with sprocket 126, engaged by the chain 127. A sprocket 128 engages chain 127 and is driven from countershaft 98 through mechanism including a gear box 128a, one revolution clutch 129, and gear box 129a. The trip element of the one revolution clutch 129 cooperates with a trip finger 131, which forms one arm of an L crank 132. The other arm of this crank is connected to a solenoid 133. When the solenoid 133 is actuated trip finger 131 releases the one revolution clutch 129, so that sprocket 128 is driven one revolution to drive the hoeing device 82. Where the hoeing device is provided with three sets of hoeing elements, the drive ratio between clutch 129 and device 82 is such that for one revolution of clutch 129, hoeing device 82 can be reasonably comparable to the speed of rotation of device 81. For example where in a typical instance device 81 rotates at a speed of 45 R. P. M., it is satisfactory to have the device 82 rotate at a speed at least as great if not greater than 81. Both gear boxes 128a and 129a can be adjustable to adjust the machine for different types of hoeing tools.

While it is possible to utilize various types of control for energizing solenoid 133, I prefer to establish automatic control by means of a photoelectric cell. The mounting of the photoelectric cell is preferably in conjunction with what I have termed a "huddler" 136. The forward part of each huddler is shown adjustably connected by a strap or bracket 137, to a sleeve 138 carried by the associated shaft 47. The rear part of each huddler is shown provided with side extensions 139, adjustably attached to the depending rod 140. These rods are in turn carried by brackets 141, mounted upon the structural members 33 of the sub-frame 32. With this type of mounting it is apparent that the huddler operates between the hoeing devices 81 and 82, and it is carried by the sub-frame so that it follows the contour of the ground contacted by the wheel 39.

Figure 4:
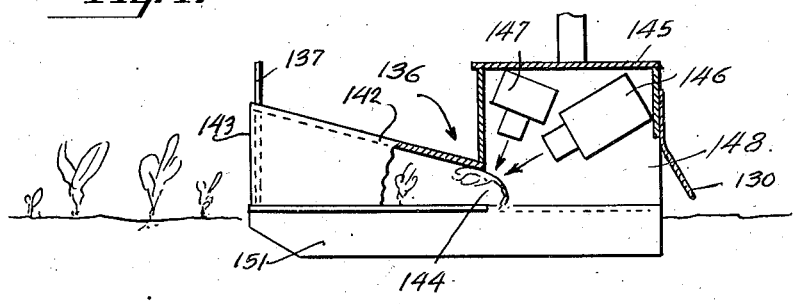
Figure 4 is a side elevational view, in cross section, showing in detail the construction of one form of huddler.
Figure 5:
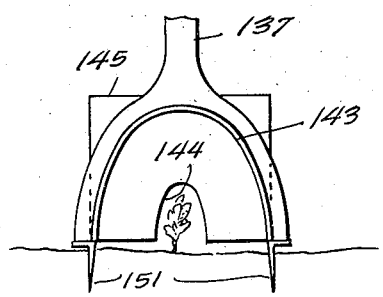
Figure 5 is an end view looking towards the left hand end of the huddler, as shown in Figure 4.

One type of huddler suitable for certain types of work is shown in Figures 4 and 5. Briefly it consists of a tapered hood portion 136, having an enlarged entrance opening or mouth 143, and a relatively restricted rear opening 144. Attached to the rear of this tapered hood there is a housing or enclosure 145 which serves to contain the electrical illuminating device 146 and the photoelectric unit 147. Both of these units may be provided with suitable lens systems for focusing upon a limited area. It will be noted that both the illuminating device and the photoelectric unit are focused upon the bent stem portions of plants as these portions pass out from the restricted opening 144 of the hood 136. The opening 148 in the rear wall of housing 145 is preferably shrouded over or enclosed by the flexible curtain or flap 130, to exclude daylight. Daylight is further excluded by providing the side edges of the device with the parallel blade-like runners 151 which can be made of suitable material such as a hardened steel, and which normally cut through the soil along parallel lines on opposite sides of the row of plants. These runners further prevent small variations in the surface of the soil from affecting the height of the huddler, or from applying excessive jarring forces.

The focusing referred to in the foregoing paragraph preferably limits the area from which the photoelectric unit receives an impulse. For example by focusing the light to form a restricted light beam or pencil, one can illuminate only a restricted area, as for example a circular area of say 1 inch in diameter, or a flat beam having a minor dimension of say ½ an inch in a vertical direction, and a width in a horizontal direction of say two inches. In this manner one can aid in the selection of sturdy plants of proper height for forming the reflecting surfaces which in turn operate the photoelectric unit.

Either the light or photoelectric unit may be provided with one or more light filters for the purpose of discriminating as to color in operating the photoelectric cell. For example red filters can be employed to aid in discriminating between the whitish stalks of good plants and plant foliage, or for discriminating between the color of a desired plant, and the characteristic color of weeds.

Figure 6 shows a suitable circuit arrangement whereby impulses from the photoelectric unit are transmitted to the solenoid 133 after a predetermined time lag. Thus the photoelectric unit 147, which may include one or two stages of vacuum tube amplification, is shown connected to a second power amplifier 153. The output of amplifier 153 is connected to the winding of a relay 154, the contacts of which are normally open. Closing of the contacts of relay 154 closes a battery circuit which can be traced from battery 155, through the contacts of relay 154, the winding of a second relay 156, back to the other side of battery 155. The timing means employed is illustrated diagrammatically in this figure and can consist for example of an arm 157 rotatably mounted upon the rotatable shaft 158, and adjustably carrying the contact pin 159. A spring 171 urges arm 157 in a counterclockwise direction against the fixed stop 172. A movable clutch element 173 is supplied to shaft 158 and is adapted to engage a clutch element 174 on the driven shaft 176. A clutch element 173 is operated by the solenoid 177, which has its windings connected respectively to the contact of relay 156, and to one side of battery 155. Shaft 176 is driven at a rate synchronous with the rotation of shafts 47, as indicated by the driving gear 178. A number of switches 179, 181 and 182 are adapted to be operated sequentially by the pin 159, as arm 157 rotates in a clockwise direction. The normally closed contacts of switch 179 are connected to a circuit 183, which when opened serves to paralyze or disrupt the amplifier 153. Opening of this circuit for example may serve to interrupt the plate circuit of one of the amplifier stages. The normally open contacts of switch 182 are included in a circuit 186, one side of which is connected to the contacts of relay 156, and the other side of which is connected to that side of the windings of this relay, which connects with the contacts of relay 154.

Operation of the arrangement shown in Figure 6 is generally as follows: Assuming that the photoelectric unit 147 receives an impulse, as by the light reflected from the stem portion of a good plant, an amplified impulse from amplifier 153 operates the relay 154 to close the contacts of the same. Closing of these contacts causes the winding of relay 156 to be energized with immediate closing of its contacts. In conjunction with the closing of the contacts of relay 156, the solenoid 177 is energized to close the clutch element 173, thus immediately commencing rotation of arm 157 in a clockwise direction. Initial movement of arm 157 causes opening of the contacts of switch 179 with the result that circuit 183 is opened and the amplifier 153 is cut out of operation. Further rotation of arm 157, after a predetermined time interval, serves to close the contacts of switch 181, thus causing the solenoid 133 to be energized. Shortly after solenoid 133 has been energized, the contacts of switch 182 are opened, thus interrupting current flow through winding of relay 156, to thereby cause the contacts of this relay to open. This in turn deenergizes the winding of solenoid 177, with the result that clutch element 173 moves to release position, and arm 157 immediately returns against its stop 172, under the urge of spring 171. With this arrangement is is apparent that solenoid 133 can be operated at a predetermined interval after an impulse has been received by the photoelectric unit 147. As will be presently explained this makes possible operation of the fine hoeing device 82 in such a manner that hoeing operations can be carried out relatively close to the stem of the selected plant. In practice switches 179, 181 and 182 can be of the micro type with adjustable mountings. Switch 181 can be adjusted to change the time lapse before its operation, and switch 182 can be adjusted relative to switch 181 to vary the time lapse before release of relay 156. In connection with adjustment of these contacts changes can be made in the hoeing devices to suit varying conditions, such as changes in the effective dimensions of the hoe elements, changes in the spacing between hoeing devices and hoe elements, and the like. Such variations may be desirable to take care of different types of plants, or to various thinning practices prevailing in different localities.

Figure 3:
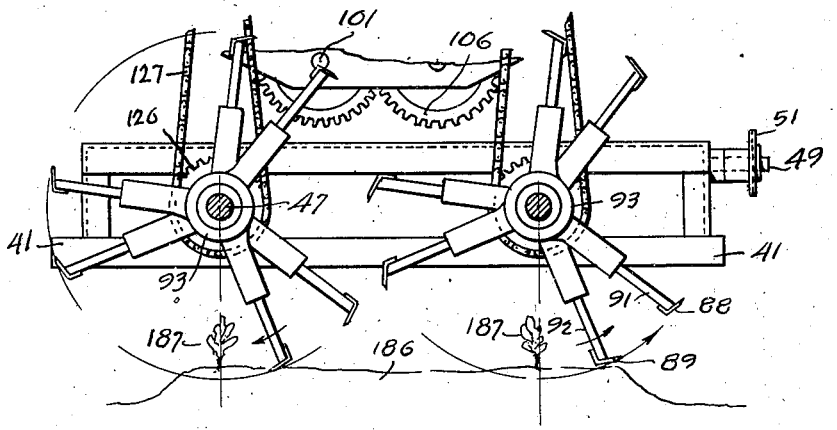
Figure 3 is an enlarged side elevational detail showing the manner in which the fine hoeing device operates upon a double row of plants, planted in a raised bed.

Figure 3 taken in conjunction with Figure 1a, will serve to illustrate more clearly the construction of the fine hoeing device 82. The arrangement of the hoeing elements 88 and 89 for each pair is such that normally when all of the hoeing elements are stationary, none of the elements contact the ground, but one pair is in readiness to pass through the ground across a row of plants, when the wheel is rotated. The effective width of each hoeing element, measured in the direction of movement of the machine, is substantially equal to the interval along the row of plants in which it is desired to select out a good plant. As will be presently explained in one example of the invention, this interval will be about 3 inches. The positioning of each of the hoes 88 and 89, of one pair, in a direction corresponding to the direction of the machine, is such that when the wheel is rotated as the machine advances, there will be an effective gap between the paths of travel of the two hoeing elements through the ground, corresponding to the spacing desired to the stem portion of a plant. In other words the two hoeing elements are so disposed that when operated the first hoeing element 88 passes in front of the plant in a close proximity with the stem, after which the second hoeing element passes through the ground on the far side of the plant. Since only one-third of a revolution is imparted to the fine hoeing wheel 82 for each actuation, it will be evident that after an actuation of the solenoid 133 the wheel again comes to rest in a position where all of the hoeing elements are out of contact with the ground. It will be evident that the number of pairs of small hoeing elements may vary with suitable changes in the drive ratios, and a greater or lesser number of pairs may be desirable in some instances.

Figure 3 likewise shows the manner in which the hoeing elements can operate upon a bed 186. It will be noted that the hoes operate with a cutting action across a row of plants 187 near the shoulder of bed, and that the movement of the hoes is toward the adjacent furrow, rather than toward the center of the bed. Operation of the hoes in this manner serves to eradicate plants, as for example plants which are defective or not as sturdy as the plant selected for keeping and to effectively eradicate such plants upon both sides of the selected plant. In addition the stem and foliage portions of the plants which are cut from the root portions, together with an upper layer of soil, are largely displaced into the furrow, leaving a darker soil surface to form a more marked contrast with remaining plants. The root portions of plants, which are left in the ground, will die. The staggering of the hoeing elements 88 and 89, one behind the other, serves to prevent the lodging of obstructions such as stones, etc., such as might occur if these elements were disposed side by side.

With respect to the coarse hoeing device 81, this can employ two hoeing elements 83 as illustrated. These elements can be simple hoeing blades, designed to operate through the soil in the same manner as hoes 88 and 89. However as previously pointed out hoeing device 81 operates continuously in timed relation with the advance of the machine, and therefore each hoeing element 83 operates upon the row of plants at regular spaced intervals. The width of the blades or hoeing elements 83 determines the allowable length of the interval along the row of plants, for which plants are to be eradicated. One may wish to vary this allowable interval according to field conditions, the effectiveness of seed germination secured, and like factors. Likewise the width of blades 83 in the direction of movement of the machine determines the length of the intervening spaces not operated upon by the elements 83, within which plants are left standing. In a typical instance where plants such as lettuce are being thinned, the hoeing device 81 can be designed to eradicate plants of a row for intervals 9 inches in length, leaving intervals about 3 inches in length in which plants are permitted to stand.

The operation of the machine can now be reviewed as follows, in conjunction with diagrammatic Figure 7: Assuming that the machine is traversing a field where plants are arranged in equally spaced parallel rows, the various hoeing devices with their associated huddlers are arranged to operate accurately upon the rows of plants. Taking the operation on one row of plants, the coarse hoeing device 81 rotates at a regular rate with the result that the hoeing elements 83 periodically act upon the row of plants to eradicate the plants at regularly spaced intervals. Thus as shown in diagrammatic Figure 7, a hoeing element 83 is passing through a row of plants to take out plants along an interval of say 9 inches. As shown by the row to the right of the hoeing element 83, this results in leaving plants within groups spaced 9 inches apart, and each group being of substantially equal length of say 3 inches. Within each of these 3 inch intervals it is likely that there is one or more good plants to be selected out for standing. In this figure it is assumed that there is only one good plant to be selected in each 3 inch interval, and these are indicated by small crossed circles. The huddler 136 follows the hoeing device 81, and following the huddler, there is the fine hoeing device 82, represented by the hoeing elements 88 and 89. Assuming that the photoelectric unit has been given an indication from the good plant in the 3 inch interval immediately adjacent to hoeing elements 88 and 89, this good plant has set the timing device of Figure 6 into operation, so that after a proper time interval, hoeing device 82 is actuated by operation of solenoid 133, to cause the hoeing elements 88 and 89 to move successively through the adjacent plants. With proper timing these elements pass through upon opposite sides of the selected plant, thus leaving this plant standing alone.

It will be evident from the above that a good plant may be found at any point along the three inch length of plants left standing by the coarse hoeing device 81. If the first plant of the clump is selected out then the timing of the fine hoeing device 82 is such that the follow-up hoeing element 89 removes all of the plants, except the first one. Conversely if the last plant of the clump is selected out to remain, then the hoeing element 88 passing in front of this plant will remove all but the plant desired. The net result of this method is to leave plants standing within the three inch intervals, so that the remaining plants will be generally spaced as desired, but the exact spacing would depend upon where the good plants are found.

In the foregoing example of course and fine hoeing reference has been made to coarse hoeing for 9 inch intervals, and fine hoeing over 3 inch intervals. It will be evident that these dimensions can be varied and also one may vary the ratio between the intervals to say provide a longer interval for coarse hoeing and a shorter interval for fine hoeing. The dimensions and ratios selected will depend upon the plants involved, field and soil conditions, the seeding practice employed, and the regularity with which the seeds have germinated and the plants grown. These various factors may also make it desirable to adjust the depth of cut taken by the various hoeing elements, which can be accomplished by varying the lengths of their mounting arms, or adjusting the mounting of wheels 39.

Note from Figure 7 that the rear hoeing element 89 of a pair is advanced forwardly in order to properly skip a plant. In Figure 1 elements 88 and 89 are shown in a common plane for simplicity.

While the coarse hoeing device is desirable to aid in securing fairly regular spacing between plants, so that for example the plants left standing will on the average be spaced about 12 inches apart, it is possible for certain operations to omit the hoeing device 81, and employ only the device 82. In such event one relies upon the timing device of Figure 6 to insure some reasonable degree of spacing between plants. One may also widen the hoeing elements of device 82 to eradicate plants between those selected by the photo electric unit.

Also in place of utilizing two separate hoeing devices as incorporated in Figures 1 and 2, it is possible to incorporate both coarse and fine hoeing elements in a single rotatable device. Such an arrangement is illustrated in Figures 8 to 10 inclusive. Thus the device in this instance is in the form of a wheel provided with a plurality of small hoeing blades or elements numbered 191 to 197 inclusive, and a relatively wider coarse hoeing element 198. Each of these hoeing elements is secured to the outer end of a radially extending bar 201, and the bars in turn are carried by arm 202 which extend outwardly, spider-like, from a central hub 203. Hub 203 is fixed to the operating shaft 47 in such a manner as to rotate continuously with advancement of the machine.

The inner ends of all of the bars 201 for hoeing elements 191 to 197 inclusive have pivotal connections 204 with their associated arms 202, and the outer ends of the arms carry guide lugs 206. Thus each of the bars 201 is free to swing in a forward direction in a plane coincident with the axis of the associated shaft 47. The bar 201 upon which the coarse hoeing element 198 is secured, is fixed to its associated arm 202. Each of the movable bars 201 is urged to a normal position by an associated spring 207. Limited swinging movement is imparted to each of these bars by means including slidable pins 208, and cam means associated with the same. Each of the pins 208 extends through an opening in its associated arm 202, to engage the adjacent portion of the movable bar 201. Also each pin is slidably supported by a disc 209, which is secured to and rotatable with the hub 203. Pins 208 carry cam rollers 211 capable of engaging the segmental cam 212. For moving this cam element between retracted and engaged positions, it is shown carried by the lower end of an arm 213, which in turn has a pivotal connection 214 with the adjacent subframe of the machine. A spring 216 urges the arm 213 in a direction to retain cam 212 in an out of the way position. An adjustable stop 217 limits the swing of arm 213 in the opposite direction, thereby fixing the positioning of cam 212 for engagement with the cam rollers 211.

When advanced to actuated position in the path of movement of cam rollers 211, the pins 208 are successively projected to swing bars 201 and their associated small hoeing elements forwardly. The amount of this forward advance depends upon the positioning of cam elements 212, as determined by the adjustable stop 217. The mechanism for operating arm 213 and cam element 212 can be solenoid 218, which in this instance takes the place of the solenoid 133 of Figure 1. This solenoid is shown acting through a fulcrumed crank 219, to operate the roller 221 against the arm 213. Thus when the solenoid 218 is actuated arm 213 is swung to the left as shown in Figure 9, to translate cam elements 212 into a fixed position in the path of movement of the rollers 211. It should be explained that the pins 208 vary in length, so that all of the rollers 211 normally occupy substantially the same plane at right angles to the axis of shaft 47.

The hoeing device of Figures 8 and 9 is used with a huddling device as previously described, and as previously explained the forward coarse hoeing device 81 is omitted. It is also desirable in this instance to utilize a suitable time switch in conjunction with the circuit of Figure 6, whereby the photo electric unit will be operative to produce an actuation of the solenoid 218 only at regularly spaced intervals, corresponding for example to 3 inch intervals along the rows of plants, separated by 9 inch intervals, and within which one desires to leave a sturdy plant. It will be evident that such a time switch can include contacting means driven in synchronism with both forward movement of the vehicle and rotation of the shafts 47.

Figure 11, taken in conjunction with Figures 8 and 9, affords a better understanding with respect to both disposition of the various hoeing elements, and operation of this device for producing both controlled fine hoeing and coarse hoeing. Thus in Figure 11 the spacing of the various hoeing elements has been developed into a flat plane, and these elements are assumed to have a path of movement inclined to the row of plants, by virtue of both peripheral velocity, and velocity of movement lengthwise of the plant row. Assuming that the wheel is rotating so that the hoeing elements move generally downwardly and to the left as viewed in Figure 11, it will be evident that the small hoeing elements have overlapping paths of action across the plant row. Assuming that all of these elements remain in their normal positions all plants within a limited interval of the row, of say 3 inches, would be eradicated. Also the action of the large hoeing element 198, following the last small element 197, would eradicate plants over a substantial interval of say 9 inches, to clear the way for again commencing fine hoeing upon a further limited interval of say 3 inches. Assuming however that the huddler operating in advance of the hoeing device has secured an indication within the 3 inch interval, from a good sturdy plant, this impulse is ultimately transmitted to solenoid 218 after a proper predetermined time lapse, to operate the cam 212. Operation of this cam causes the small hoe elements which have not already passed across the row, to be advanced forwardly, as indicated for example by the dotted line positions of the hoe elements 194, 195 and 196. It will be evident that this advancing of the hoes is sufficient to cause the same to skip the good plant, indicated by a crossed circle, thus causing the undesired plants upon the far side of the selected plant to be eradicated. It will be evident that in a like manner a plant can be selected from any place in the limited interval, and depending upon where the plant is located, the small hoeing elements will be advanced accordingly to skip and leave the same. The peculiar helicoidal positioning of the small hoeing elements makes for relatively accurate fine hoeing, while the coarse hoeing element 198 permits such fine hoeing for short spaced intervals while at the same time permitting forward advancement of the machine at a reasonable speed.

Figures 12 to 14 inclusive illustrate a type of hoeing device adapted particularly for weeding operations, as distinguished from the thinning out of plants. In this case two pairs of hoes 231 and 232 are carried by the radial arms 233, and these arms in turn are attached to the hub 234. As illustrated in Figure 12, the device is intended to be rotated in a clockwise direction. The shaping of the hoeing blades may vary in accordance with the type of work to be done, the character of the soil, and like factors. The particular shaping illustrated makes possible a relatively compact structure, with adequate hoeing between plants spaced comparatively regularly along rows. The spacing $a$ between the individual knives of one pair is such that for the speed of rotation and the speed of advancement of the vehicle, the knives pass upon opposite sides of a plant stalk as illustrated in Figure 14. The gaps $b$ between the pairs of hoeing blades is such that when one of these gaps is lowermost, the wheel may remain at rest while the vehicle advance without performing hoeing operations upon the plants.

In utilizing the hoeing device of Figures 12 and 13, the device is rotatably mounted upon the shaft 47 of the machine shown in Figure 1, and the sprocket 236 carried by the hub 234 is engaged by the chain 127. The hoeing devices 81 and 82 are of course omitted. The ratios afforded by the gear boxes 128a and 129a are such as to drive the device at an appropriate rate for the rate of forward movement of the vehicle, and the ratio of gear box 128a in particular is such that for each operation of the one revolution clutch 129, the hoeing device is rotated one half revolution, and then is brought to rest with one of the gaps $b$ lowermost. The huddler is also used in connection with this device, and effects automatic control of the solenoid 133, the same as previously described. Thus when a plant is located by the photo electric cell, an impulse is received by the circuit of Figure 6 which sets the timing mechanism in operation, so that at an appropriate instant the one revolution clutch 129 is tripped to cause one half revolution of the hoeing device of Figure 12. From Figure 14 it will be noted that the two pairs of hoeing blades are designed to overlap between the successive hoeing operations about individual plants, and in addition assures complete hoeing action with eradication of weeds between plants.

It will be apparent that the hoeing device of Figures 12 and 13 can be varied as to proportioning, and its operation can be modified depending upon the size and character of the plants. Larger plants, with larger stalks, require greater spacing corresponding to the gap $a$ and likewise variations in spacing between the plants may require modifications as to proportioning, speed of operation, and the like. In any event this device serves to automatically remove weeds between plants, to either greatly lessen or to eliminate hand weeding.

Figure 17:
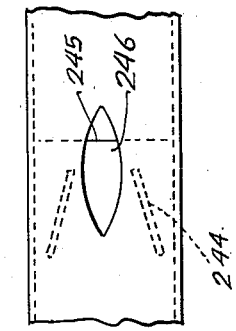
Figure 17 is a view like Figure 16, but showing the opening enlarged by action of plants over which the huddler is passing.
Figure 16:
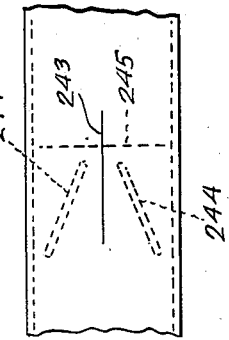
Figure 16 is an enlarged view of the variable opening incorporated in the device of Figure 15.
Figure 15:
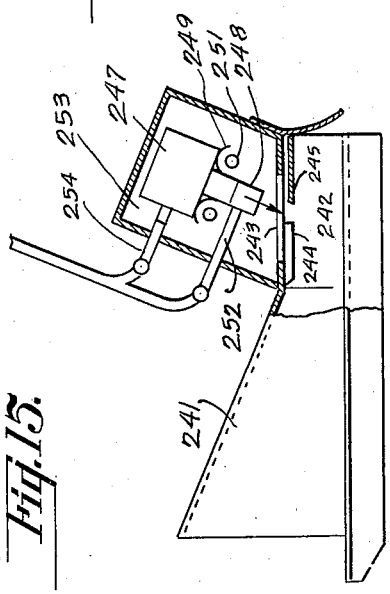
Figure 15 is a side elevational view, in cross section, showing another type of huddler having a variable opening through which plant areas are exposed to the photoelectric cell.

Figures 15 to 17 inclusive show a modified type of huddler involving use of an automatically variable aperture. In this case the huddler includes the tapered hood 241, through which the plants enter, and a rear tunnel shaped portion 242 made of pliable material such as natural or synthetic rubber. The upper wall of tunnel 242 has a slit 243, and extending from the wall portions on opposite sides of this slit are the depending ribs 244. It will be noted that the ribs 244 converge together as shown in Figure 16, whereby when a plant of substantial size is passing through the tunnel 242, the foliage of this plant is somewhat squeezed together by engagement with ribs 244, thus causing these ribs to be urged apart to spread the slit 243 and thus form an aperture 246 (Fig. 17). A baffle wall 245 underlies the rear end of slit 243, to prevent jamming and tearing away of foilage. The photoelectric unit 247 is sighted toward the aperture 246, so that a response can be obtained from the stem portions or foliage of a plant as these portions are exposed. The lens barrel 248 of photoelectric unit 247 is in this instance surrounded by the annular reflector 249, and the electric lens 251.

To minimize the problem of dust, the lens barrel 248 has an outer extension connected to the tube 252, through which a stream of air is introduced to thereby prevent entrance of dust. Likewise the general enclosure 253 about the photo electric unit is shown connected to a tube 254 for introduction of air, thereby tending to prevent entrance of dust into the space occupied by unit 247. It will be evident that such means can be utilized with any of the huddler arrangements shown such as the huddler previously described, or the huddlers which will be subsequently described with reference to Figures 18 to 27 inclusive.

Figure 19:
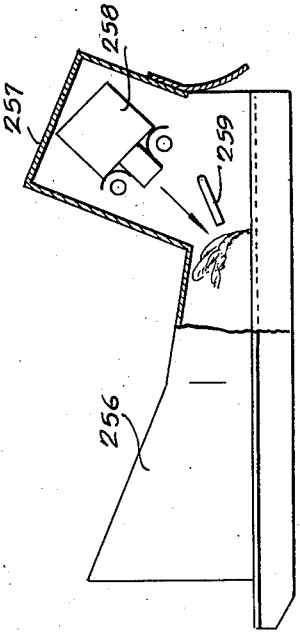
Figure 19 is a side elevational view, partly in cross section, of the huddler shown in Figure 18.
Figure 18:
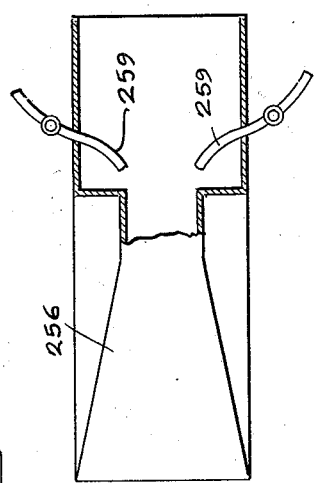
Figure 18 is a plan view, partly in cross section, showing another type of huddler making use of compressed air for securing a huddling effect.

The huddler Figures 18 and 19 likewise utilizes a tapered entrance hood 256, in conjunction with the housing 257 for the photoelectric unit 258. A pair of air nozzles 259 extend into the huddler below the unit 258 and terminate near the egress of the tapered hood 256. These nozzles are connected by a flexible hose to a suitable source of compressed air. By suitably positioning the nozzles the foliage and stem portions of plants entering the hood 256 can be blown forwardly, thus bending over the plants in such a fashion that the photoelectric unit 258 can be sighted upon the bent over stem portions of the plant, between the ground surface and the leaves.

The huddler of Figures 20 and 21 makes use of a hood or housing 261, provided with knife like runners 262, and adapted to receive plants, which in this instance may be of substantial size. Daylight is largely excluded from the interior of this housing by flexible entrance and exit flaps 263, through which the plants may enter and leave the housing 261. Extending from one side of the hood 261 there is an enclosure 264 for the photoelectric unit 266. The lamp 267 in this instance is shown covered by the light filter 265, so that light having various color characteristics may be employed. The lens system of the photoelectric unit is shown sighted upon the foliage portion of the plants. It will be evident that this manner of securing a response from the foliage portions may be used for coarse hoeing operations on plants of substantial size, where one does not desire the accuracy to be obtained by an indication from the stem or stalk portions. As previously explained the light filter 265 can be selected in accordance with the results desired. For example the color for this filter can be selected to aid in distinguishing the foliage of the plants from foliage of undesired vegetation, such as weeds or grass.

The arrangement in Figure 22 is similar to Figures 20 and 21 in that the photo electric cell 266 is likewise located to one side of the plant row. However in this instance the enclosure 269 and the photoelectric cell 266 are arranged so that the lens system is sighted upon the stalks of the plants. Here again the light filter 265 can be of such a character as to aid in securing an indication from the desired plants, and to distinguish from foliage and stalks of other plants such as weeds, grass, and the like.

The huddler shown in Figures 23 and 24 is likewise adapted for larger size plants. In this instance the hood 271 is provided with the entrance and egress flexible flaps 272 and 273. Within the hood there are a pair of endless belts 274, with each belt being carried by the pulleys 276 and 277. Vertical shafts 278 and 279 carry the pulleys, and are suitably journaled for operation of the belts. One of the shafts 278 is shown connected to motive means 281, which can include suitable gearing and an electric motor. Shafts 279 are shown interconnected by gears 282. The adjacent runs of the belts 274 are arranged parallel on opposite sides of the center of the device. As shown in Figure 23, it will be evident that the motor 281 drives the belts in the direction indicated by the arrows. When this huddler passes over a plant of substantial size, the foliage of the plant is pressed between the adjacent runs of the belt 274, substantially as illustrated in Figures 23 and 24, the compression being in a direction laterally of the row of plants. Near the egress end of the hood there is baffle wall 283, against which the foliage of the plant is pressed, and immediately before the plant passes beneath this baffle through the egress flaps 273. The photoelectric unit 284 within the side enclosure 286 is sighted upon the plant while the plant is compressed. In this instance the indication is taken from the compressed foliage portion of the plant. In the operation of this huddler the belts are driven at a speed depending upon the type of plants and the type of indication desired. While the speed of operation may be such that the compressed portion of the plant is either moved backwardly or forwardly with respect to the ground, in a typical instance the speed of the belts will be comparable to the forward speed of the huddler, so that the engaged plant is neither bent forwardly nor backwardly, prior to longitudinal compression against the baffle 283.

Figure 25 illustrates an arrangement making use of two photoelectric units for sighting upon the same plant. Thus in this case the huddler hood 291 has an enclosure 292 for the photoelectric units 293 and 294. These units are shown sighted upon different areas of a plant with these areas being illuminated by the focused lamps 296, 297. Both units 293 and 294 are shown connected to a common electrical network 295, which can be a conventional vacuum tube bridge arranged to require impulses of substantially equal intensities from the two photoelectric units, to pass on an impulse to the power amplifier 153 of the circuit shown in Figure 6. Thus with this arrangement a double light response is required for a tripping operation. Suitable light filters can also be employed with this arrangement to secure color discrimination.

Figures 26 and 27 illustrate a huddler provided with mechanical means for urging the leaf and stem portions forwardly in the direction of movement of the machine. Thus in this instance the huddler includes the hood like enclosure 298. At the forward end of the enclosure there is a wheel 299 including a hub 299a journaled on a horizontal axis, and fingers 299b formed of resilient material like rubber. The wheel is shown driven by the electric motor 300 through the drive extension 300a. The fingers of wheel 299 gently wipe across the plants and urge the leaf and stem portions forwardly after which the plants pass beneath a baffle or shelf 301. Photoelectric and illumination units 302 and 303 are focused upon the bent stalks or stems of the plants as these plants appear at the rear edge of baffle 301. Note that the baffle has a rear wall with a reduced opening 302 through which the plants must pass. A forward flexible flap 298a serves to exclude light.

Where it may not be necessary to hoe close to the plants the device of Figure 8 can be simplified by eliminating the enlarged hoe 198 and by having the other hoeing blades equally spaced in a common plane like the spokes of a wheel. After an actuation of cam 212 to skip a plant the timer would remain in such position until the skipped plant is cleared. An arrangement of this character is shown in Figure 28. Thus the hoes 305 are all of the same size and are mounted on the outer ends of the pivoted bars 304. The wheel hub 306 carries equally spaced arms 307 with which the pivoted bars are associated. The operating pins 308 are all of the same length and carry cam rollers 309 which engage the cam 212.

It will be evident from the foregoing that I have provided a machine capable of a wide variety of operations in the culture of plants, and capable of either completely or largely eliminating hand labor in many agricultural operations. In the raising of many plants one can take care to plant seed in regularly spaced rows, in order to facilitate use of my machine. When the seed has germinated and the plants are up to a sufficient height for thinning, my machine equipped with fine and coarse hoeing means as previously described, is passed over the rows of plants, and as a result good plants are left at fairly regularly spaced intervals, and the intervening plants are eradicated and largely moved into the furrows. Where the plants have grown so closely together that in some instances two or more plants are left in place of a single plant, a small amount of hand labor may be required in order to secure a complete thinning. After thinning and before the plants have reached maturity, it is customary to use cultivating tools operating lengthwise of the rows, and in addition it is necessary to carry out weeding operations between the plants. My machine is again used for such weeding operations in the manner previously described, with the hoeing action between the plants serving to eradicate weeds, and to largely shift these weeds into the furrows.

In the use of the huddler for thinning operations, distinguishing immature from sturdy plants is facilitated by sighting upon the stem portions of the plant. This is because the stem portions of many plants tend to be considerably lighter in color after the plant has grown to a substantial height, and this characteristic light color can be distinguished from other plants or foliage, by use of a suitable light filter. For example I have found that in connection with lettuce the stalk of a young plant of sturdy character is nearly white. By use of a red light filter the stalk can be distinguished from the darker green color of foliage, or the darker color of relatively immature plants not sufficiently sturdy for selection. Also when my huddler is used for thinning the method employed involves a displacement of the foliage to obtain a light indication for areas, namely the stem portions, which give an indication which is accurately indicative of the root location. This makes possible accurate plant location which in turn makes possible hoeing in close proximity to plants. In place of a red light filter one may advantageously use any one of a wide variety of filters depending upon the plants involved and the conditions of operation, such as varying degrees of maturity of the plants. Also under certain conditions special filter combinations may be desirable. It is to be understood that such filter practice can be applied to all of the various huddlers described herein.

Certain subject matter disclosed but not claimed herein is being disclosed and claimed in my co-pending application Serial No. 575,992, filed February 3, 1945.

I claim:

1. In an agricultural machine, a frame adapted to move along a row of plants, hoeing means movably carried by the frame and adapted to operate on the row of plants over regularly spaced areas, additional hoeing means movably carried by the frame and adapted to operate within the intervals between the first named areas, and a light sensitive means serving to control the action of said second named means responsive to a plant in a desired condition of growth.

2. In an agricultural machine, a frame movable along a row of plants, hoeing means movably carried by the frame and adapted to eradicate plants of a row over regularly spaced areas, additional hoeing means carried by the frame and adapted to eradicate plants within the intervals lying between the first named areas, light sensitive means responsive to a plant in a desired condition of growth located within one of said intervals, and means controlled by said light sensitive means for controlling said second named hoeing means, thereby causing said additional hoeing means to eradicate plants upon both sides of a plant in a desired condition of growth.

3. In an agricultural machine, a frame movable along a row of plants, a shaft rotatably carried by the frame, means for driving the shaft, a hoeing device secured to the shaft and adapted to operate upon the row of plants over regularly spaced areas as the shaft rotates and as the frame moves forwardly, whereby within such areas plants are eradicated, an additional hoeing device carried by the shaft, said additional hoeing device including at least one pair of spaced hoeing elements adapted to operate upon opposite sides of a plant in a desired condition of growth located within the intervals of the row intervening between said areas, and photoelectric means to control operation of said last named hoeing device responsive to the location of plants in a desired condition of growth within last named intervals.

4. In an agricultural machine, a frame adapted to be traversed along a row of plants, a ground engaging hoeing device carried by the frame and adapted to operate upon the row of plants, photoelectric means responsive to a plant in a desired condition of growth, means adapted to be actuated to cause the hoeing device to operate on opposite sides of such plant, and means including a timing mechanism set in operation by the photoelectric means and serving to transmit a controlled actuating impulse to the hoeing device.

5. In an agricultural machine, a frame adapted to move along a row of plants, hoeing means carried by the frame and adapted to operate upon the row of plants, power means for operating the hoeing means, means including a light sensitive unit for controlling operation of the hoeing means, whereby hoeing is confined to spaces between desired plants in the row, a huddler adapted to move along the row of plants and connected to move in unison with the frame, said huddler comprising enclosing walls serving to exclude exterior daylight from the interior of the same, and also including means adapted to bend over the leaf and stem portions of plants over which the huddler is passing, and a source of artificial light associated with the huddler and arranged to illuminate stem portions of the plants as the plants are being bent over, said light sensitive unit being disposed to receive light reflected from the stem portions of the plants.

6. In an agricultural machine, a frame adapted to move along a row of plants, a hoeing device carried by the frame, means for driving the hoeing device for operating upon the row over regularly spaced areas, a second hoeing device spaced rearwardly of the first named hoeing device, said second hoeing device being adapted to operate between said areas, means for controlling said second hoeing device, means including a photoelectric unit for effecting control of said second named hoeing device in accordance with selected plants located within said intervals, a huddler located between the first and second named hoeing devices, and an artificial source of light associated with the huddler for illuminating plants over which the huddler passes, said photoelectric unit being disposed to receive light reflected from illuminated portions of the plants.

7. In an agricultural machine, a frame adapted to move along a row of plants, hoeing means carried by the frame and adapted to operate upon a row of plants, power means for operating the hoeing means, means including a light sensitive unit for controlling operation of the hoeing means, means supported by the frame for bending plants in a row generally forwardly in the direction of travel of the frame, and a source of artificial light supported by the frame and arranged to illuminate the stem portions of the plants as the plants are being bent over, said light sensitive unit being disposed to receive light reflected from the stem portions of the plants.

8. In an agricultural machine, a supporting frame adapted to move along a row of plants, means carried by the frame for first hoeing regularly spaced areas along the row of plants and also for subsequently hoeing within the intervals between the first named intervals and upon opposite sides of a selected plant, and means responsive to a plant in a desired condition of growth for controlling said hoeing means.

9. In an agricultural machine, a frame adapted to move along a row of plants, implements carried by the frame and adapted to operate upon the row, power means for operating said implements, means including a light sensitive unit for controlling operation of the implements, a device adapted to move along the row of plants and connected to move in unison with the frame, said device including walls serving to substantially exclude exterior daylight from plants within the device and also including means adapted to bend over plants within the device, and a source of artificial light associated with the device and arranged to illuminate bent over stem portions of the plants, said light sensitive unit being disposed to receive light from the illuminated stem portions of the plants.

10. In an agricultural machine, a frame adapted to move along a row of plants, hoeing means guided by the frame and adapted to operate upon the row, power means for operating said hoeing means, means including a light sensitive unit for controlling operation of the hoeing means, a device adapted to move along the row of plants and connected to move in unison with the frame, said device including walls serving to substantially exclude exterior daylight from the plants within the device and also including means adapted to bend over plants within the device, and a source of artificial light associated with the device and arranged to illuminate bent over stem portions of the plants, said light sensitive unit being disposed to receive light from the illuminated bent over stem portions of the plants.

11. In an agricultural machine, a supporting frame adapted to move along a row of plants, means carried by the frame for first hoeing regularly spaced areas along the row of plants, means for subsequently hoeing within the intervals between the first named areas and upon opposite sides of a selected plant, and light sensitive means responsive to a plant in a desired condition of growth for controlling said second named hoeing means.

12. In an agricultural machine, a frame adapted to be traversed along a row of plants, means carried by the frame for first hoeing regularly spaced areas along the row of plants, means for subsequently hoeing within the intervals between the first named areas and upon opposite sides of a selected plant, and light sensitive means responsive to a plant in a desired condition of growth located within said intervals for controlling the action of said second named hoeing means within the intervals.

13. In an agricultural machine, a frame adapted to move along a row of plants, implements carried by the frame and adapted to operate upon the row, power means for operating said implements, means including a light sensitive unit for controlling operation of the implements, a device adapted to move along the row of plants and connected to move in unison with the frame, said device including walls serving to substantially exclude exterior daylight from plants within the device and also including means adapted to compress the foliage of plants within the device in a lateral direction, and a source of artificial light associated with the device and arranged to illuminate portions of the plants while the foliage of the plants is in compressed condition.

14. In an agricultural machine, a frame adapted to move along a row of plants, implements carried by the frame and adapted to operate upon a row, power means for operating said implements, means including a light sensitive unit for controlling operation of the implements, a device adapted to move along the row of plants and connected to move in unison with the frame, said device including walls serving to substantially exclude exterior daylight from plants within the device, a source of light carried by the device, means forming an aperture between the source of light and the plants through which light may pass from the source to illuminate the plants passing beneath the opening, said means including portions engaging plants passing beneath the same to thereby vary the size of the opening in accordance with the size of a plant, and a light sensitive unit arranged to receive light reflected from a plant exposed through said opening.

LEO A. MARIHART.